US010852157B2

(12) United States Patent
Shafaat et al.

(10) Patent No.: US 10,852,157 B2
(45) Date of Patent: Dec. 1, 2020

(54) GUIDANCE DISPLAY FOR CONTROLLING AIRCRAFT TURNS FOR AIRCRAFT SPACING

(71) Applicant: The Boeing Company, Chicago, IL (US)

(72) Inventors: Syed Tahir Shafaat, Everett, WA (US); John Allin Brown, Snohomish, WA (US); Minh-Tri Le, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 428 days.

(21) Appl. No.: 14/813,550

(22) Filed: Jul. 30, 2015

(65) Prior Publication Data
US 2017/0030734 A1 Feb. 2, 2017

(51) Int. Cl.
*G01C 23/00* (2006.01)
*G08G 5/00* (2006.01)

(52) U.S. Cl.
CPC ......... *G01C 23/005* (2013.01); *G08G 5/0008* (2013.01); *G08G 5/0013* (2013.01); *G08G 5/0021* (2013.01); *G08G 5/0039* (2013.01); *G08G 5/0052* (2013.01)

(58) Field of Classification Search
CPC ........... B60T 8/1708; B60T 7/20; G08G 1/22; B60D 1/245; B60D 1/62
USPC ...................................................... 701/122
See application file for complete search history.

(56) References Cited

U.S. PATENT DOCUMENTS

| 2004/0239529 | A1* | 12/2004 | Tran | G01C 23/00 340/961 |
| 2007/0208465 | A1* | 9/2007 | Gremmert | G05D 1/0607 701/4 |
| 2008/0262665 | A1* | 10/2008 | Coulmeau | G08G 5/0039 701/16 |
| 2009/0157287 | A1* | 6/2009 | Shafaat | G01C 23/005 701/120 |

(Continued)

OTHER PUBLICATIONS

Abbott, "A Revised Trajectory Algorithm to Support En Route and Terminal Area Self-Spacing Concepts," National Aeronautics and Space Administration, NASA/CR-2010-216204, Feb. 2010, 68 pages.

(Continued)

*Primary Examiner* — Khoi H Tran
*Assistant Examiner* — Rodney P King
(74) *Attorney, Agent, or Firm* — Yee & Associates, P.C.

(57) ABSTRACT

A method and apparatus of controlling movement of an aircraft. A turn path off of a planned route for an aircraft comprising a turn to direct the aircraft to an intercept point on the planned route is determined. A planned route indicator depicting the planned route, a turn path indicator depicting the turn path, and an aircraft position indicator indicating a position of the aircraft are displayed to an operator of the aircraft at the same time on a turn guidance display. Deviation limit indicators for the planned route, the turn path, or both, may be displayed on the turn guidance display. Indicator characteristics of the deviation limit indicators may be changed in response to aircraft deviations from the planned route or the turn path by more than the deviation limits. The turn guidance display is used to control the movement of the aircraft to follow the turn path.

20 Claims, 12 Drawing Sheets

(56) References Cited

U.S. PATENT DOCUMENTS

| | | | | |
|---|---|---|---|---|
| 2009/0259402 A1* | 10/2009 | Gates | ................... | G08G 3/02 |
| | | | | 701/301 |
| 2011/0035080 A1* | 2/2011 | Murphy | ................ | B64D 45/04 |
| | | | | 701/9 |
| 2011/0082644 A1* | 4/2011 | Imasaka | ................ | A01K 97/00 |
| | | | | 701/494 |
| 2012/0053760 A1* | 3/2012 | Burnside | ............. | G05D 1/0676 |
| | | | | 701/3 |
| 2012/0318929 A1* | 12/2012 | Golling | ................. | B64C 13/18 |
| | | | | 244/203 |
| 2013/0120166 A1* | 5/2013 | Kommuri | ............ | G08G 5/0013 |
| | | | | 340/971 |
| 2013/0261850 A1* | 10/2013 | Smith | ................. | G01C 23/005 |
| | | | | 701/3 |
| 2014/0014768 A1* | 1/2014 | Lassen | ..................... | B64C 3/56 |
| | | | | 244/49 |
| 2014/0097972 A1* | 4/2014 | Barraci | ............... | G01C 23/005 |
| | | | | 340/971 |

OTHER PUBLICATIONS

Scharl et al., "Aircraft Turns for Interval Management," USPTO U.S. Appl. No. 14/568,581, filed Dec. 12, 2014, 56 pages.

* cited by examiner

GUIDANCE DISPLAY FOR CONTROLLING AIRCRAFT TURNS FOR AIRCRAFT SPACING

BACKGROUND INFORMATION

1. Field

The present disclosure relates generally to defining appropriate flight paths for aircraft and controlling the movement of aircraft in flight. More particularly, the present disclosure relates to defining appropriate turns for aircraft in flight and controlling aircraft in flight to perform appropriate turns to achieve a desired spacing between aircraft in flight.

2. Background

The spacing between aircraft in flight may be managed to organize and expedite the flow of air traffic in an effective, efficient, and reliable manner. For example, without limitation, a desired spacing between aircraft approaching an airport runway for landing may be established to improve or optimize the efficiency of landing operations at the airport. Management of the spacing between aircraft in flight may be referred to as interval management.

The management and control of the spacing between aircraft in flight may be implemented by an air traffic control system or other appropriate entity. For example, air traffic controllers in an air traffic control system may use various surveillance screens and alerting functions to monitor and manage the spacing between aircraft in a sector or other area of aircraft operations. Currently, air traffic controllers may instruct the flight crew or other operator of an aircraft in flight to change one or more of the speed, heading, and altitude of the aircraft to achieve and maintain a desired spacing between the aircraft and other aircraft in a traffic stream. In this case, the flight crew or other operator of the aircraft may be dependent on such instructions from the air traffic controllers for maintaining safe and efficient distances between the aircraft and other aircraft in the traffic stream.

It thus may be desirable to control an aircraft in flight in an appropriate manner to achieve a desired spacing between the aircraft and another aircraft in flight. It also may be desirable that the flight crew or other operator of an aircraft in flight has the capability to achieve closer and more regular spacing between the aircraft and other aircraft in flight with less dependence on help from air traffic controllers.

Accordingly, it would be beneficial to have a method and apparatus that take into account one or more of the issues discussed above, as well as possible other issues.

SUMMARY

The illustrative embodiments of the present disclosure provide a method of controlling movement of an aircraft. A turn path off of a planned route for the aircraft comprising a turn to direct the aircraft to an intercept point on the planned route for the aircraft where the aircraft rejoins the planned route for the aircraft is determined. A planned route indicator, a turn path indicator, and an aircraft position indicator are displayed to an operator of the aircraft at the same time on a turn guidance display. The planned route indicator depicts the planned route for the aircraft. The turn path indicator depicts the turn path relative to the planned route for the aircraft. The planned route indicator and the turn path indicator have different indicator characteristics. The aircraft position indicator indicates a position of the aircraft relative to the planned route for the aircraft and the turn path. The turn guidance display is used to control the movement of the aircraft to follow the turn path.

The illustrative embodiments of the present disclosure also provide an apparatus comprising a turn calculator and a display generator. The turn calculator is configured to determine a turn path off of a planned route for an aircraft comprising a turn to direct the aircraft to an intercept point on the planned route for the aircraft where the aircraft rejoins the planned route for the aircraft. The display generator is configured to display to an operator of the aircraft at the same time on a turn guidance display a planned route indicator, a turn path indicator, and an aircraft position indicator. The planned route indicator depicts the planned route for the aircraft. The turn path indicator depicts the turn path relative to the planned route for the aircraft. The planned route indicator and the turn path indicator have different indicator characteristics. The aircraft position indicator indicates a position of the aircraft relative to the planned route for the aircraft and the turn path.

The illustrative embodiments of the present disclosure also provide a method of controlling movement of an aircraft. A planned route for the aircraft is identified. Planned route deviation limits substantially parallel to the planned route for the aircraft are determined. A planned route deviation limits indicator and an aircraft position indicator are displayed to an operator of the aircraft at the same time on a turn guidance display. The planned route deviation limits indicator depicts the planned route deviation limits. The aircraft position indicator indicates a position of the aircraft relative to the planned route deviation limits. The turn guidance display is used to control the movement of the aircraft.

The illustrative embodiments of the present disclosure also provide an apparatus comprising an information receiver, a deviation identifier, and a display generator. The information receiver is configured to receive information identifying a planned route for an aircraft. The deviation identifier is configured to determine planned route deviation limits substantially parallel to the planned route for the aircraft. The display generator is configured to display a planned route deviation limits indicator and an aircraft position indicator to an operator of the aircraft at the same time on a turn guidance display. The planned route deviation limits indicator depicts the planned route deviation limits for the aircraft. The aircraft position indicator indicates a position of the aircraft relative to the planned route deviation limits.

Various features, functions, and benefits may be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and benefits thereof, will best be understood by reference to the following detailed description of illustrative embodiments of the present disclosure when read in conjunction with the accompanying drawings, wherein:

DETAILED DESCRIPTION

Figure 1:
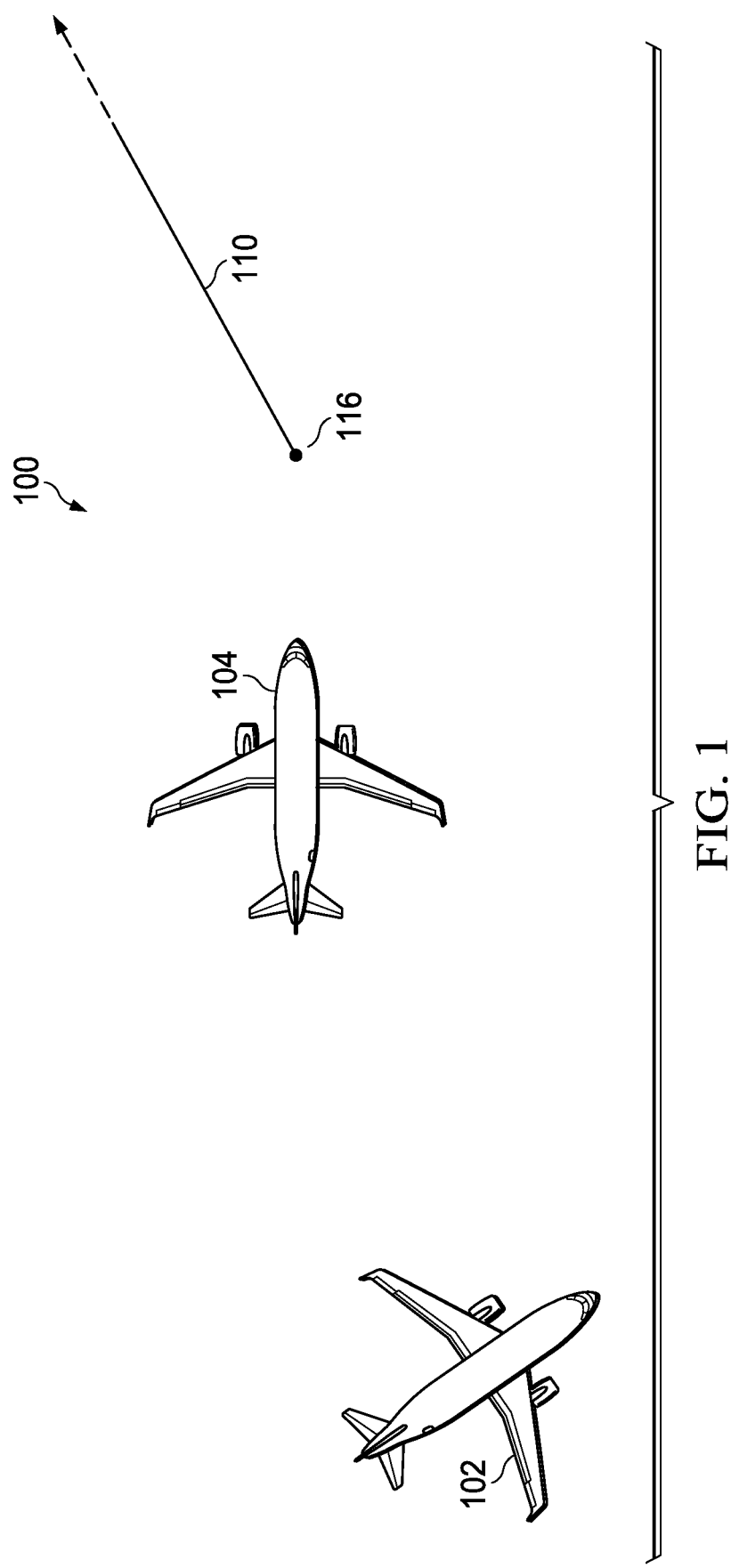
FIG. 1 is an illustration of an aircraft operating environment in accordance with an illustrative embodiment.

Different illustrative embodiments recognize and take into account a number of different considerations. "A number," as used herein with reference to items, means one or more items. For example, "a number of different considerations" are one or more different considerations.

Different illustrative embodiments recognize and take into account that it may be desirable to control an aircraft in flight to achieve a desired spacing between the aircraft and another aircraft in flight. Various concepts for air traffic control and airspace management that are currently under development may require aircraft to achieve and maintain closer and more consistent spacing over a certain point after takeoff, en route, or prior to landing. Such a requirement for aircraft spacing may increase airspace, airport, or runway capacity, and may result in fuel savings and a reduction in undesirable emissions.

The different illustrative embodiments also recognize and take into account that, in some circumstances, an air traffic controller may instruct an aircraft to depart from a planned route for the aircraft and then return to the planned route for the aircraft to achieve desired spacing between the aircraft and another aircraft. For example, without limitation, an air traffic controller may instruct an aircraft to depart from and return to the planned route for the aircraft in cases where controlling the speed of the aircraft alone may not achieve a desired spacing between the aircraft and another aircraft. The air traffic controller may instruct the aircraft to depart from and return to the planned route for the aircraft to either increase or reduce the distance traveled by the aircraft. In either case, the flight crew or other operator of the aircraft may need guidance information to control the movement of the aircraft to comply with the instructions from the air traffic controller.

The different illustrative embodiments also recognize and take into account that, in some circumstances, an aircraft that is instructed to follow a lead aircraft at a desired distance, the lead aircraft, or both, may deviate from a planned route or turn path for the aircraft or from a planned route for a lead aircraft. For example, without limitation, the aircraft, the lead aircraft, or both, may deviate from the planned route or turn path either inadvertently or for operational reasons. Such deviations by the aircraft, the lead aircraft, or both, may make planned control of the movement of the aircraft to achieve a desired spacing between the aircraft and the lead aircraft inaccurate. It may be desirable for the flight crew or other operator of the aircraft to know when one or both of the aircraft and the lead aircraft is not conforming to a planned path or route, so that following the plan for controlling movement of the aircraft may be suspended and a new plan for controlling the movement of the aircraft to achieve the desired spacing between the aircraft and the lead aircraft may be determined.

Illustrative embodiments provide a display of various graphical indicators to an operator of an aircraft in flight to help the operator to control the aircraft to achieve a desired spacing behind another aircraft in flight. For example, without limitation, the various graphical indicators may be displayed to the flight crew or other operator of an aircraft on a navigational or other display on the flight deck of the aircraft.

Illustrative embodiments provide a system and method for determining a turn path for an aircraft when the aircraft is instructed to depart from a planned route for the aircraft and return to the planned route for the aircraft to either increase or reduce the distance traveled by the aircraft to achieve a desired spacing between the aircraft and a lead aircraft. A turn guidance display may display the planned route for the aircraft, the turn path for the aircraft, and an indicator of the current position of the aircraft with respect to the planned route and the turn path. The turn guidance display may be used by an operator of the aircraft to control the movement of the aircraft to follow the turn path. For example, the turn guidance display may indicate when a turn in the turn path needs to be initiated. The turn guidance display also may indicate whether the aircraft is staying close enough to the turn path to intercept the planned route for the aircraft at a desired intercept point.

Illustrative embodiments also provide for monitoring the movement of an aircraft and the movement of a lead aircraft to determine whether the aircraft is conforming to a planned route or a turn path for the aircraft and the lead aircraft is conforming to a planned route for the lead aircraft. An indication is provided to the flight crew or other operator of the aircraft when either one or both of the aircraft and the lead aircraft deviates from the planned route or turn path by more than a certain deviation limit.

Turning to FIG. 1, an illustration of an aircraft operating environment is depicted in accordance with an illustrative embodiment. Aircraft operating environment 100 may include any appropriate airspace in which a number of aircraft may be in flight. For example, without limitation, aircraft 102 and aircraft 104 may be in flight in aircraft operating environment 100. The symbols representing aircraft 102 and aircraft 104 indicate the relative positions of aircraft 102 and aircraft 104 in aircraft operating environment 100 at a point in time. The symbols representing aircraft 102 and aircraft 104 are not necessarily drawn to scale with respect to distances in aircraft operating environment 100. More than two aircraft may be in flight in aircraft operating environment 100.

For example, without limitation, aircraft 102 and aircraft 104 may be commercial passenger aircraft or any other appropriate type of aircraft that may be used for any appropriate purpose. Aircraft 102 and aircraft 104 may be the same type of aircraft or may be different types of aircraft.

Aircraft 102 and aircraft 104 may be in flight on and following planned routes in operating environment 100. The planned route for aircraft 102 may be different from the planned route for aircraft 104 or the same as the planned route for aircraft 104.

It may be desirable that at least a portion of the planned route for aircraft 102 is the same as at least a portion of the planned route for aircraft 104. For example, without limitation, aircraft 102 and aircraft 104 may be directed to land on a designated runway at an airport. Route portion 110 may be a preferred approach route for aircraft landing on the designated runway. In this case, route portion 110 may comprise a common part of the route for aircraft 102 and the route for aircraft 104.

In this example, the route for aircraft 102 may merge with the route for aircraft 104 at merge point 116. In this example, aircraft 104 will reach merge point 116 before aircraft 102. Therefore, in this example, aircraft 104 may be referred to as a lead aircraft with respect to aircraft 102. The routes for aircraft 102 and aircraft 104 may be selected such that aircraft 102 may achieve and maintain a desired spacing from aircraft 104 at merge point 116 or at a later point on route portion 110 when aircraft 102 joins aircraft 104 on common route portion 110. For example, without limitation, an air traffic control system or other entity may instruct aircraft 102 to achieve a desired spacing with aircraft 104.

An air traffic control system or other entity may instruct aircraft 102 to depart from a planned route for aircraft 102 to either increase or reduce the distance traveled by aircraft 102 to achieve the desired spacing between aircraft 102 and aircraft 104. Aircraft 102 may rejoin the planned route for aircraft 102 at a point further along the planned route from the point where aircraft 102 departed from the planned route. In accordance with an illustrative embodiment, a turn path for directing aircraft 102 that has departed from a planned route back to the planned route may be determined and displayed to an operator of aircraft 102 in a manner to help the operator of aircraft 102 to control the movement of aircraft 102 to follow the turn path to achieve the desired spacing between aircraft 102 and aircraft 104.

Figure 2:
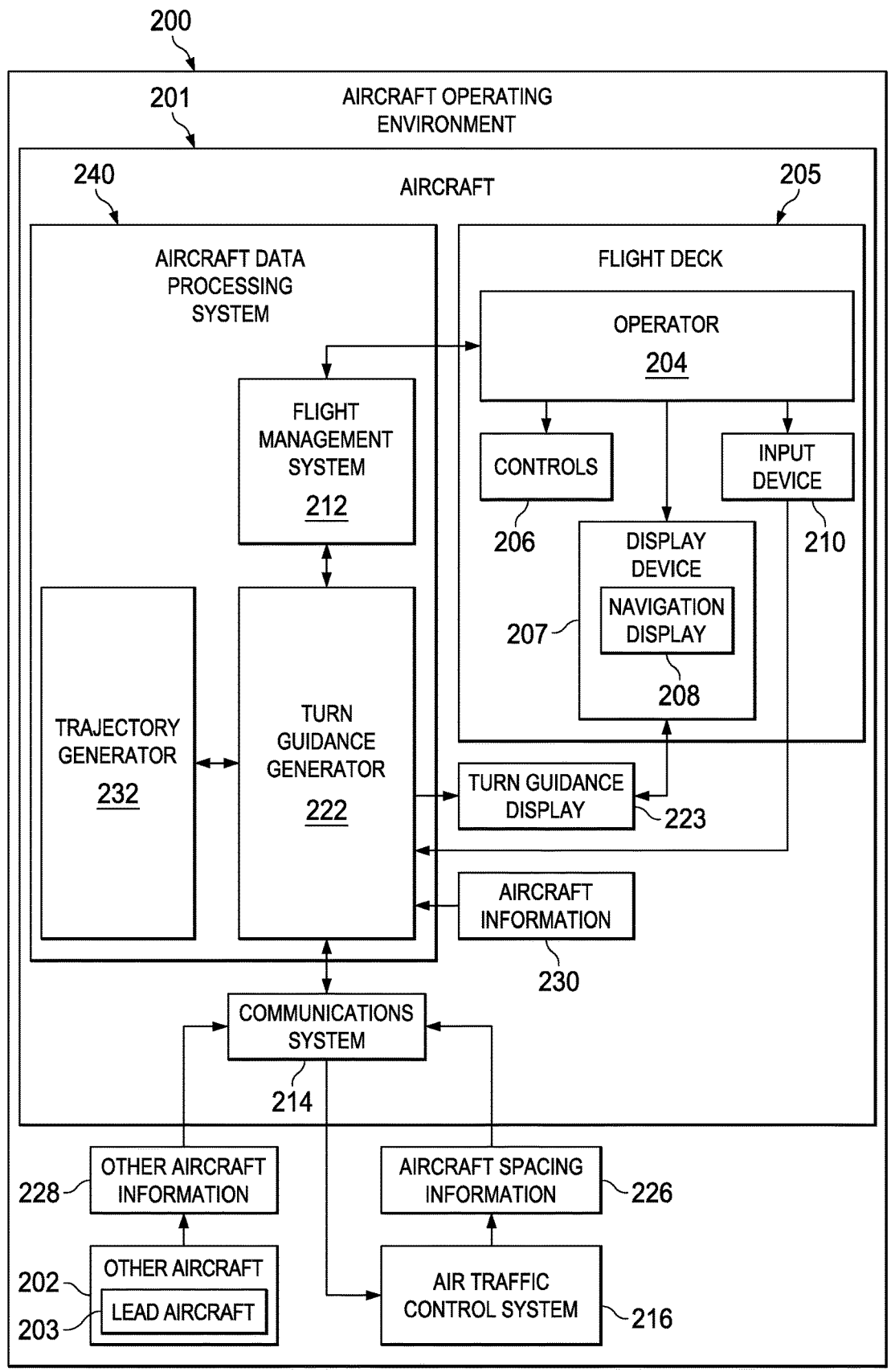
FIG. 2 is an illustration of a block diagram of an aircraft operating environment in accordance with an illustrative embodiment.

Turning to FIG. 2, an illustration of a block diagram of an aircraft operating environment is depicted in accordance with an illustrative embodiment. Aircraft operating environment 200 may be an example of one implementation of aircraft operating environment 100 in FIG. 1. Aircraft 201 and other aircraft 202 may be in flight in aircraft operating environment 200. Aircraft 201 and other aircraft 202 may be examples of implementations of aircraft 102 and aircraft 104, respectively, in FIG. 1. For example, without limitation, other aircraft 202 may be referred to as lead aircraft 203 with respect to aircraft 201. More than two aircraft may be in flight in aircraft operating environment 200.

Aircraft 201 and other aircraft 202 may be commercial passenger aircraft, cargo aircraft, private or personal aviation aircraft, military aircraft, or any other appropriate type of aircraft that may be used for any appropriate purpose. Aircraft 201 and other aircraft 202 may be fixed wing, rotary wing, or lighter-than-air aircraft. Aircraft 201 and other aircraft 202 may be manned aircraft or unmanned aerial vehicles. Aircraft 201 and other aircraft 202 may be the same type of aircraft or may be different types of aircraft.

The movement of aircraft 201 while in flight in aircraft operating environment 200 may be controlled manually by operator 204. Operator 204 may be a pilot, other member of a flight crew, or other human operator of aircraft 201. Operator 204 may control aircraft 201 from flight deck 205 of aircraft 201 or from another appropriate location by the manipulation of appropriate controls 206. Flight deck 205 also or alternatively may be referred to as the cockpit of aircraft 201. Controls 206 may be manipulated to control the operation of various systems on aircraft 201. For example, without limitation, operator 204 may use controls 206 to turn aircraft 201, to change the speed of aircraft 201, or to control the movement of aircraft 201 in aircraft operating environment 200 in any other appropriate manner or in various combinations of ways.

For example, without limitation, when aircraft 201 is an unmanned aerial vehicle, operator 204 may control aircraft 201 from a remote operator station. Flight deck 205 thus may comprise a controller station that is not located on aircraft 201 when aircraft 201 is an unmanned aerial vehicle.

Operator 204 may use various types of information in various ways to control the operation of aircraft 201 in an appropriate manner. Information for the control of aircraft 201 by operator 204 may be displayed to operator 204 on display device 207. Any appropriate information, from any appropriate source, may be displayed to operator 204 on display device 207 in any appropriate format. Display device 207 may include any appropriate number of display devices. Display device 207 may be implemented on aircraft 201 in any appropriate manner. For example, without limitation, display device 207 may be implemented on flight deck 205 of aircraft 201 in any appropriate manner. Navigation display 208 on flight deck 205 may be an example of one implementation of display device 207.

Operator 204 may enter various types of information into various systems on aircraft 201 for various purposes. Information for the control of aircraft 201 or other appropriate purposes may be entered into the appropriate systems on aircraft 201 by operator 204 via input device 210. Any appropriate information may be entered in any appropriate format into any appropriate system on aircraft 201 by operator 204 via input device 210. Input device 210 may include any appropriate number of input devices. Input device 210 may be implemented on aircraft 201 in any appropriate manner. For example, without limitation, input device 210 may be implemented on flight deck 205 of aircraft 201 in any appropriate manner.

Display device 207 and input device 210 may be implemented as separate devices on aircraft 201. Alternatively, display device 207 and input device 210 may be implemented together as a single device on aircraft 201. For example, without limitation, display device 207 and input device 210 may be implemented together as a touch screen display device on aircraft 201 or in another appropriate manner.

The movement of aircraft 201 while in flight in aircraft operating environment 200 may be controlled automatically or automatically in combination with manual control of aircraft 201 by operator 204. For example, without limitation, automatic control of the movement of aircraft 201 in flight may be provided by flight management system 212 on aircraft 201 or in another appropriate manner. Flight management system 212 may comprise a specialized computer system that automates a wide variety of in-flight tasks. Flight management system 212 may be configured to perform in-flight management of a flight plan for aircraft 201. For example, without limitation, flight management system 212 may be configured to use information from various sensors to determine the position of aircraft 201 and to guide aircraft 201 along the planned route defined in the flight plan.

Aircraft 201 may include communications system 214. Communications system 214 may include a number of appropriate systems for communicating with systems off of aircraft 201. For example, without limitation, communications system 214 may be configured for communication with air traffic control system 216 and other aircraft 202. Communications system 214 may be configured to provide voice communications, both addressed and broadcast data communications other than voice communications, or both voice and other data communications.

Turn guidance generator 222 on aircraft 201 may be configured to generate turn guidance display 223. For example, without limitation, turn guidance generator 222 may be configured to generate turn guidance display 223 for use in controlling the movement of aircraft 201 by operator 204 to follow a turn path to direct aircraft 201 that has been instructed to depart from a planned route to an intercept point on the planned route for aircraft 201 to achieve a desired spacing of aircraft 201 with other aircraft 202. Turn guidance display 223 generated by turn guidance generator 222 may be used to turn aircraft 201 at a turn point in the turn path. An example of one implementation of turn guidance generator 222 in accordance with an illustrative embodiment is described below with reference to FIG. 3. An example of implementations of processes for generating turn guidance display 223 by turn guidance generator 222 is described below with reference to FIGS. 10-11A and 11B. Turn guidance generator 222 may be configured to use aircraft spacing information 226, other aircraft information 228, and aircraft information 230 for aircraft 201 to generate turn guidance display 223.

Aircraft spacing information 226 may include information that identifies a desired spacing between aircraft 201 and other aircraft 202. For example, without limitation, aircraft spacing information 226 may include one or more of information that identifies other aircraft 202, a planned route for other aircraft 202, and desired spacing between aircraft 201 and other aircraft 202. Aircraft spacing information 226 also may include instructions for aircraft 201 to depart from a planned route for aircraft 201, or any other appropriate information for use by turn guidance generator 222 to generate turn guidance display 223.

Aircraft spacing information 226 may be provided to aircraft 201 by air traffic control system 216 via communications system 214. For example, without limitation, aircraft spacing information 226 may comprise a clearance issued by air traffic control system 216 to operator 204 of aircraft 201. Air traffic control system 216 may comprise any system or entity with the responsibility to control air traffic in a portion of air space. For example, without limitation, air traffic control system 216 may comprise terminal control associated with an airport or other location for the take-off and landing of aircraft, an area control center for controlling aircraft en route between areas covered by terminal control, or another appropriate air traffic control system. Air traffic control system 216 will have the appropriate authority to order or request movements of aircraft 201 by providing aircraft spacing information 226 to aircraft 201.

Other aircraft information 228 may include information about other aircraft 202 used by turn guidance generator 222 to generate turn guidance display 223. For example, without limitation, other aircraft information 228 may include information identifying the current state of other aircraft 202. Other aircraft information 228 identifying the current state of other aircraft 202 may include information identifying the current position, track, and speed of other aircraft 202.

Other aircraft information 228 may be provided to aircraft 201 from other aircraft 202 via communications system 214 or in another appropriate manner. For example, without limitation, other aircraft information 228 may be provided from other aircraft 202 to aircraft 201 via automatic dependent surveillance-broadcast, ADS-B. Automatic dependent surveillance-broadcast is a cooperative surveillance technology in which an aircraft determines its position via satellite navigation and periodically broadcasts it, enabling the aircraft to be tracked.

Aircraft information 230 may include information about aircraft 201 that is used by turn guidance generator 222 to generate turn guidance display 223. For example, without limitation, aircraft information 230 may include information identifying the current state of aircraft 201 and a planned route for aircraft 201. Aircraft information 230 identifying the current state of aircraft 201 may include information identifying the current position, track, and speed of aircraft 201.

Aircraft information 230 may be provided by appropriates systems on aircraft 201 or in another appropriate manner. For example, without limitation, aircraft information 230 identifying the current state of aircraft 201 may be provided by flight management system 212, by a satellite-based or other appropriate navigation system on aircraft 201, or by another appropriate system or combination of systems on aircraft 201.

Turn guidance generator 222 may use trajectory generator 232 to predict the movement of aircraft 201 and other aircraft 202. Trajectory generator 232 may comprise any appropriate system or method for predicting the movement of aircraft 201 and other aircraft 202. Trajectory generator 232 may be configured to properly represent a flyable trajectory in three dimensions, including proper construction of turns and representative of the intended flight path in the vertical, lateral, and longitudinal directions. For example, without limitation, the functionality of trajectory generator 232 may be implemented as part of flight management system 212. Alternatively, trajectory generator 232 may be implemented separately from flight management system 212.

Turn guidance display 223 generated by turn guidance generator 222 may be used to control the movement of aircraft 201. For example, without limitation, turn guidance display 223 may be displayed to operator 204 on display device 207 and used by operator 204 to control the movement of aircraft 201 to follow a turn path to achieve a desired spacing between aircraft 201 and other aircraft 202.

The turn guidance generated by turn guidance generator 222 may be provided to flight management system 212 in addition to being used to generate turn guidance display 223. Turn guidance provided from turn guidance generator 222 to flight management system 212 in the appropriate format may allow for flight management system 212 to control automatically the movement of aircraft 201 to follow the turn path as determined by turn guidance generator 222 and as displayed in turn guidance display 223. In this case, operator 204 may monitor aircraft 201 following the turn path rather than control aircraft 201 to follow the turn path.

One or more of flight management system 212, turn guidance generator 222, and trajectory generator 232 may be implemented in software or in software in combination with hardware on aircraft data processing system 240. Aircraft data processing system 240 may comprise any number of appropriate data processing systems on aircraft 201.

Figure 3:
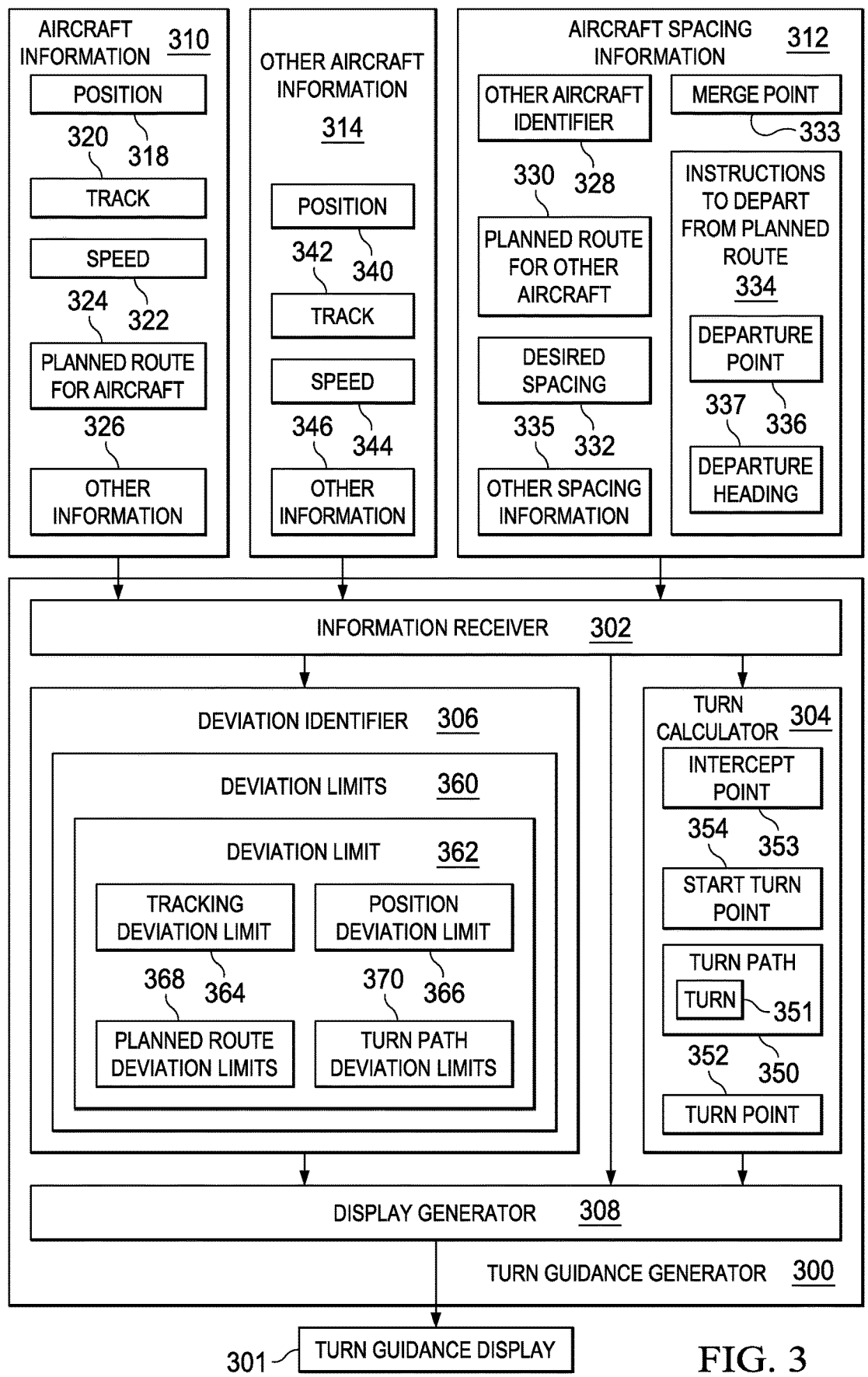
FIG. 3 is an illustration of a block diagram of a turn guidance generator in accordance with an illustrative embodiment.

Turning to FIG. 3, an illustration of a block diagram of a turn guidance generator is depicted in accordance with an illustrative embodiment. Turn guidance generator 300 may be an example of one implementation of turn guidance generator 222 in FIG. 2.

Turn guidance generator 300 is configured to generate turn guidance display 301. Turn guidance display 301 may be used to control the movement of an aircraft to follow a turn path to achieve a desired spacing between the aircraft and another aircraft. Turn guidance generator 300 may comprise information receiver 302, turn calculator 304, deviation identifier 306, and display generator 308.

Information receiver 302 may be configured to receive various types of information from various sources for use by turn guidance generator 300 to generate turn guidance display 301. For example, without limitation, information receiver 302 may be configured to receive aircraft information 310, aircraft spacing information 312, other aircraft information 314, other appropriate information, or various combinations of information for use by turn guidance generator 300 to generate turn guidance display 301.

Aircraft information 310 may include, without limitation, information identifying the current position 318, track 320, and speed 322 of the aircraft to be controlled using turn guidance display 301. Aircraft information 310 also may include information identifying planned route for the aircraft 324, other information 326 regarding the current state or other condition or characteristic of the aircraft, or various combinations of information regarding the aircraft. Aircraft information 310 may be provided by appropriate systems onboard the aircraft or in another appropriate manner.

Aircraft spacing information 312 may include other aircraft identifier 328 and may identify planned route for the other aircraft 330 and desired spacing 332 between the aircraft and the other aircraft. Other aircraft identifier 328 may identify the other aircraft in flight in any appropriate manner. Planned route for the other aircraft 330 may be identified in any appropriate manner. Desired spacing 332 may be the desired spacing between the aircraft and the other aircraft at a certain point on the planned route for the aircraft 324. For example, without limitation, aircraft spacing information may identify desired spacing 332 spacing between the aircraft and the other aircraft when the aircraft is at merge point 333 where planned route for the aircraft 324 merges with planned route for the other aircraft 330.

Aircraft spacing information 312 also may include instructions to depart from planned route 334, other spacing information 335, or various combinations of spacing information. For example, without limitation, instructions to depart from planned route 334 may identify departure point 336 where the aircraft is instructed by an air traffic control system to depart from planned route for the aircraft 324. Alternatively, or in addition, instructions to depart from planned route 334 may indicate a departure heading 337 or track 320 for the aircraft departing from planned route for the aircraft 324 at departure point 336 or at another appropriate point. Aircraft spacing information 312 may be received from an air traffic control system or other appropriate source of aircraft spacing information 312.

Other aircraft information 314 may include, without limitation, information identifying the current position 340, track 342, and speed 344 of the other aircraft, other information 346 regarding the other aircraft, or various combinations of information regarding the other aircraft. Other aircraft information 314 may be provided by the other aircraft or in another appropriate manner.

Turn calculator 304 may be configured to determine turn path 350. Turn path 350 comprises turn 351 for an aircraft that is off of planned route for aircraft 324 to direct the aircraft to intercept point 353 on planned route for the aircraft 324 where the aircraft rejoins planned route for the aircraft 324. Turn 351 may be determined from turn point 352 that may be determined by turn calculator 304 in any appropriate manner. Turn calculator 304 also may be configured to determine start turn point 354. Start turn point 354 is a point on turn path 350 where turn 351 begins. In other words, start turn point 354 may be a point in turn path 350 where an aircraft should begin to turn from a current track to execute turn 351.

Deviation identifier 306 is configured to determine deviation limits 360 and to determine whether an aircraft is operating within deviation limits 360. For example, without limitation, deviation limits 360 may include planned route deviation limits 368, turn path deviation limits 370, or both.

Planned route deviation limits 368 may be defined by distances from planned route for aircraft 324, planned route for other aircraft 330, or both, on each side of planned route for aircraft 324, planned route for other aircraft 330, or both. Planned route deviation limits 368 preferably run substantially parallel to planned route for aircraft 324, planned route for other aircraft 330, or both, along at least a portion of each side of planned route for aircraft 324, planned route for other aircraft 330, or both. The distance of planned route deviation limits 368 from planned route for aircraft 324, planned route for other aircraft 330, or both, may be the same along the length of planned route for aircraft 324, planned route for other aircraft 330, or both, for which planned route deviation limits 368 are determined. Alternatively, the distance of planned route deviation limits 368 from planned route for aircraft 324, planned route for other aircraft 330, or both, may be different for different portions of planned route for aircraft 324, planned route for other aircraft 330, or both, for which planned route deviation limits 368 are determined. For example, the distance of planned route deviation limits 368 from curved portions of planned route for aircraft 324, planned route for other aircraft 330, or both, may be greater than the distance of planned route deviation limits 368 from straight portions of planned route for aircraft 324, planned route for other aircraft 330, or both. For example, without limitation, the distance of planned route deviation limits 368 from planned route for aircraft 324, planned route for other aircraft 330, or both, may be 4 miles or another appropriate distance from curved portions of planned route for aircraft 324, planned route for other aircraft 330, or both. The distance of planned route deviation limits 368 from planned route for aircraft 324, planned route for other aircraft 330, or both, may be 2 miles or another appropriate distance from straight portions of planned route for aircraft 324, planned route for other aircraft 330, or both.

Turn path deviation limits 370 may be defined by distances from turn path 350 on each side of turn path 350. Turn path deviation limits 370 preferably run substantially parallel to turn path 350 along at least a portion of each side of turn path 350. The distance of turn path deviation limits 370 from turn path 350 may be the same along the length of turn path 350 for which turn path deviation limits 370 are determined. Alternatively, the distance of turn path deviation limits 370 from turn path 350 may be different for different portions of turn path 350 for which turn path deviation limits 370 are determined. For example, the distance of turn path deviation limits 370 from curved portions of turn path 350 may be greater than the distance of turn path deviation limits 370 from straight portions of turn path 350. For example, without limitation, the distance of turn path deviation limits 370 from turn path 350 may be 4 miles or another appropriate distance from curved portions of turn path 350. The distance of turn path deviation limits 370 from turn path 350 may be 2 miles or another appropriate distance from straight portions of turn path 350.

Deviation limit 362 in deviation limits 360 may be used as track deviation limit 364, position deviation limit 366, or both. Deviation limit 362 is used as position deviation limit 366 when it is determined whether the current position of an aircraft is within deviation limit 362. Deviation limit 362 is used as track deviation limit 364 when it is determined whether the track of an aircraft that is not currently outside of deviation limit 362 indicates that the aircraft is likely to move beyond deviation limit 362 within a threshold period of time. An aircraft on a track that indicates that the aircraft is likely to move beyond deviation limit 362 within the threshold period of time may be referred to as tracking outside of deviation limit 362.

Display generator 308 may be configured to generate turn guidance display 301 using information provided by information receiver 302, turn path 351 determined by turn calculator 304, and deviation limits 360 determined by deviation identifier 306.

Figure 4:
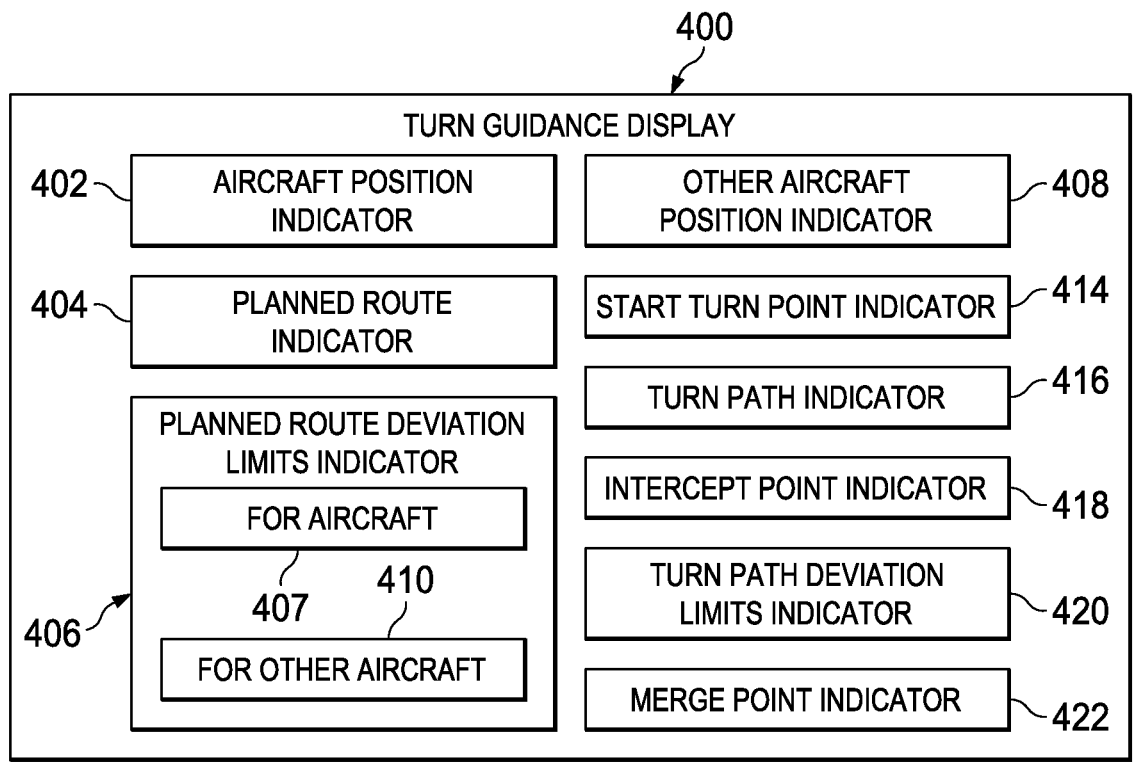
FIG. 4 is an illustration of a block diagram of a turn guidance display in accordance with an illustrative embodiment.

Turning to FIG. 4, an illustration of a block diagram of a turn guidance display is depicted in accordance with an illustrative embodiment. Turn guidance display 400 may be an example of one implementation of turn guidance display 223 in FIG. 2 and turn guidance display 301 in FIG. 3.

Turn guidance display 400 may comprise one or more of aircraft position indicator 402, planned route indicator 404, planned route deviation limits indicator 406, other aircraft position indicator 408, start turn point indicator 414, turn path indicator 416, intercept point indicator 418, and merge point indicator 422. One or more of these indicators may be displayed simultaneously to an operator of an aircraft in turn guidance display 400.

Aircraft position indicator 402 indicates the current position of the aircraft for which turn guidance display 400 is generated. Planned route indicator 404 may indicate a planned route for the aircraft, a planned route for another aircraft, or both. Planned route deviation limits indicator 406 may indicate planned route deviation limits for the aircraft 407, for another aircraft 410, or both. Other aircraft position indicator 408 may indicate the current position of the other aircraft.

Turn path indicator 416 may indicate the turn path off of the planned route for the aircraft comprising a turn to direct the aircraft to an intercept point on the planned route for the aircraft where the aircraft rejoins the planned route. Start turn point indicator 414 may indicate a point on the turn path where the turn begins. Intercept point indicator 418 may indicate the intercept point where the turn path rejoins the planned route for the aircraft. Turn path deviation limits indicator 420 may indicate turn path deviation limits relative to the turn path. Merge point indicator 422 may indicate the merge point where the route of the aircraft merges with the route of the other aircraft.

Figure 5:
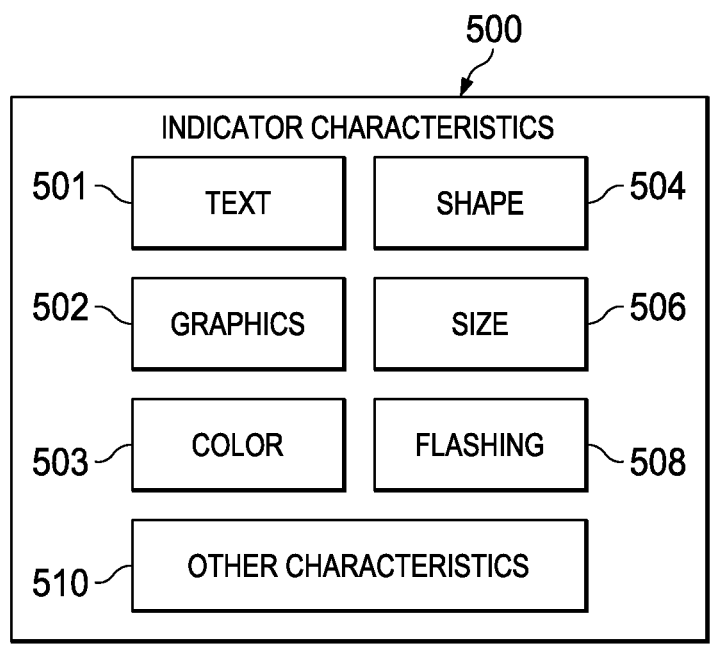
FIG. 5 is an illustration of a block diagram of indicator characteristics in accordance with an illustrative embodiment.

Turning to FIG. 5, an illustration of a block diagram of indicator characteristics is depicted in accordance with an illustrative embodiment. Indicator characteristics 500 may be examples of types of characteristics of the indicators comprising turn guidance display 400 in FIG. 4.

The various indicators in a turn guidance display in accordance with an illustrative embodiment may comprise text 501, graphics 502, or both text 501 and graphics 502. The various indicators may be distinguished by graphical variation in color 503, shape 504, size 506, flashing 508, other characteristics 510, or various combinations of graphical or textual characteristics, or both. A number of indicator characteristics 500 of an indicator in a turn guidance display in accordance with an illustrative embodiment may be changed to convey useful information to the operator of an aircraft viewing the turn guidance display, as described in more detail below.

The illustrations of FIGS. 1-5 are not meant to imply physical or architectural limitations to the manner in which different illustrative embodiments may be implemented. Other components in addition to, in place of, or in addition to and in place of the ones illustrated may be used. Some components may be unnecessary in some illustrative embodiments. Also, the blocks are presented to illustrate some functional components. One or more of these blocks may be combined, divided, or combined and divided into different blocks when implemented in different illustrative embodiments.

Figure 6:
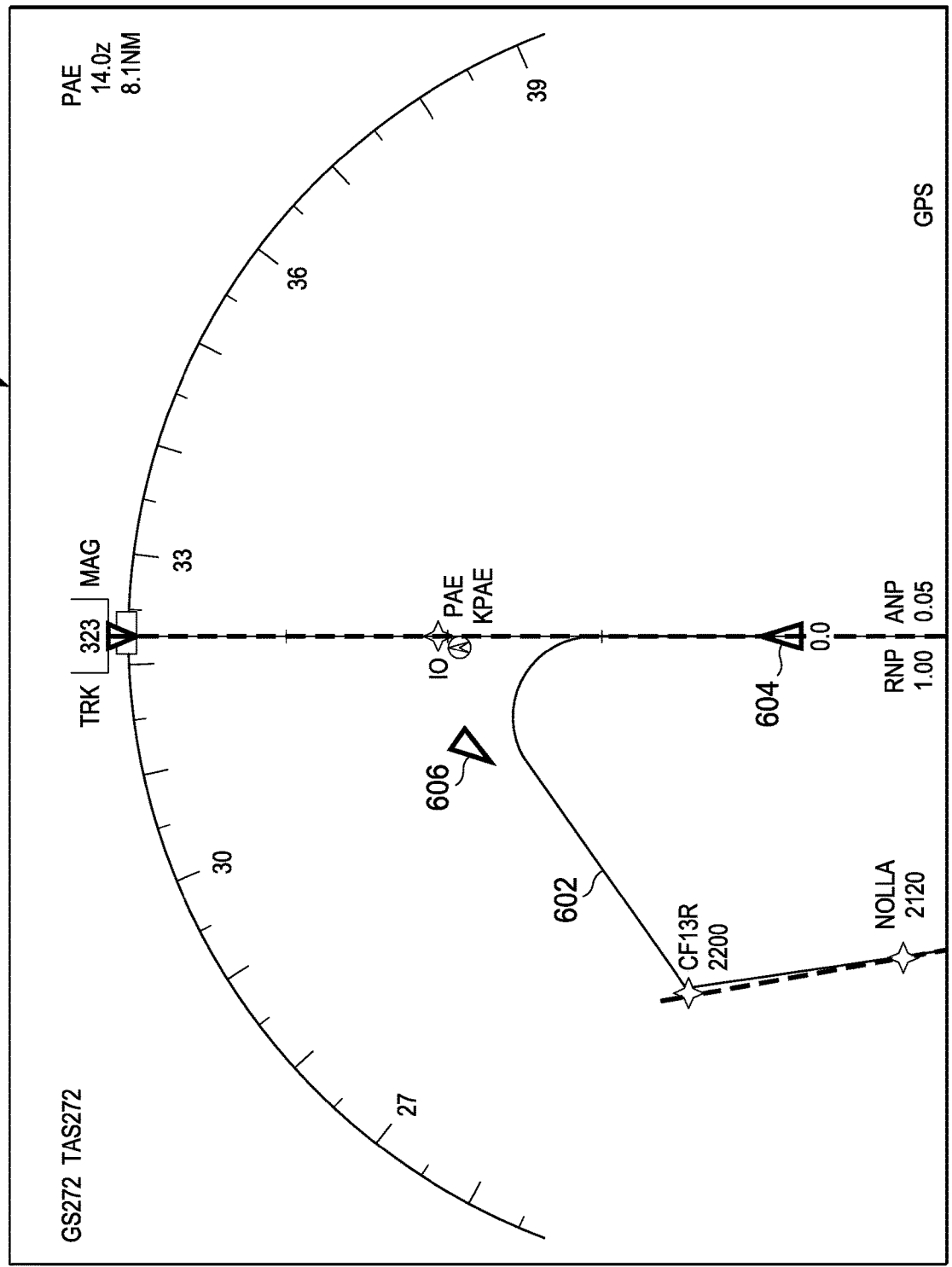
FIG. 6 is an illustration of an example of an air traffic display integrated into a navigation display for aircraft spacing in accordance with an illustrative embodiment.

Turning to FIG. 6, an illustration of an example of an air traffic display integrated into a navigation display for aircraft spacing is depicted in accordance with an illustrative embodiment. Display 600 may be an example of one implementation of a display on which turn guidance display 223 in FIG. 2, turn guidance display 301 in FIG. 3, and turn guidance display 400 in FIG. 4 may be implemented.

Turn guidance display 600 comprises a navigation display including planned route indicator 602 indicating a planned route for an aircraft. Aircraft position indicator 604 indicates the current position of the aircraft with respect to the planned route for the aircraft. Other aircraft indicator 606 indicates the position of another aircraft that will be merging with the planned route for the aircraft at a merge point. In this example, a desired spacing between the aircraft and the other aircraft is to be achieved at the merge point or at some point later on the planned route.

Figure 7:
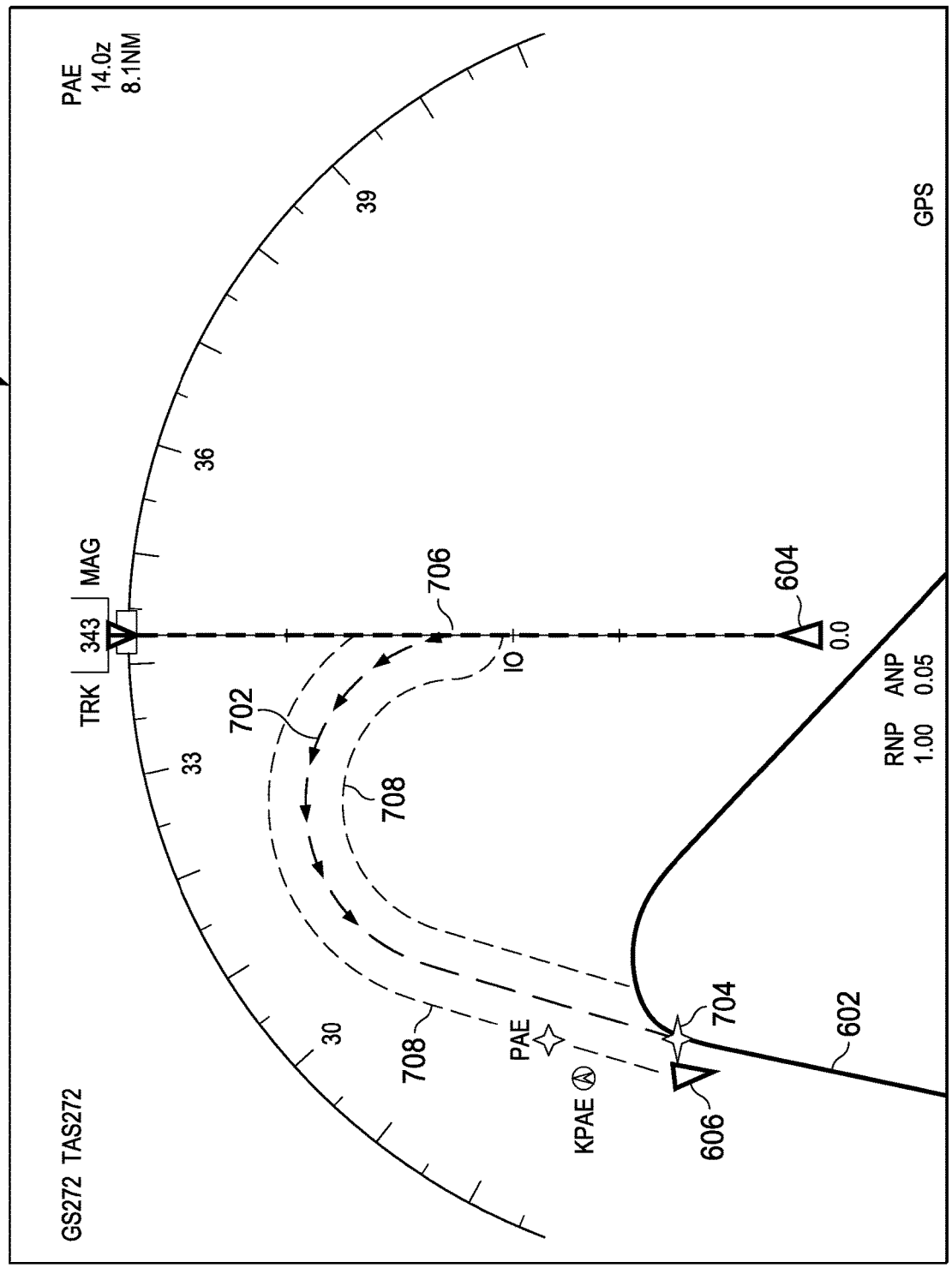
FIG. 7 is an illustration of an example of a turn guidance display for turning an aircraft outside of a turn in a planned route for the aircraft to increase spacing with another aircraft in accordance with an illustrative embodiment.

Turning to FIG. 7, an illustration of an example of a turn guidance display for turning an aircraft outside of a turn in a planned route for the aircraft to increase spacing with another aircraft is depicted in accordance with an illustrative embodiment. Turn guidance display 700 may result from a determination by air traffic control that the situation shown in turn guidance display 600 in FIG. 6 indicates that the current spacing between the two aircraft is too close. As a result of this determination, air traffic control may instruct the aircraft to turn right from the planned route for the aircraft and then to return to the planned route for the aircraft at an intercept point when it is determined that the desired spacing is now achievable and can be achieved by a certain point.

Turn guidance display 700 includes turn path indicator 702 indicating the turn path for the aircraft to follow back to the intercept point 704 on the planned route for the aircraft. Turn path indicator 702 may have different indicator characteristics from planned route indicator 602 so that an operator may easily distinguish between turn path indicator 702 and planned route indicator 602. The color or other number of indicator characteristics of turn path indicator 702 may change to indicate to the operator of the aircraft to initiate the turn to the left at start turn point 706 or to stay on the curved path.

Turn path deviation limits may be indicated by turn path deviation limit indicators 708 that are substantially parallel with turn path indicator 702 on each side of turn path indicator 702. If the aircraft deviates from the turn path by more than a selected amount, turn path indicator 702 may change to a different color or shape to attract the operator's attention to return the aircraft to the curved path and may also provide new turn guidance if necessary. If no timely action is taken by the operator, turn path indicator 702 may change color or shape again, to warn the operator that soon it may not be possible to achieve the desired spacing behind the other aircraft without increasing the speed significantly in this example.

Intercept point indicator 704 indicates the intercept point where the turn path for the aircraft intercepts the planned route for the aircraft. The color or other number of indicator characteristics of intercept point indicator 704 may change to indicate when the desired spacing cannot be achieved by the intercept point or by another defined point on the planned route.

Figure 8:
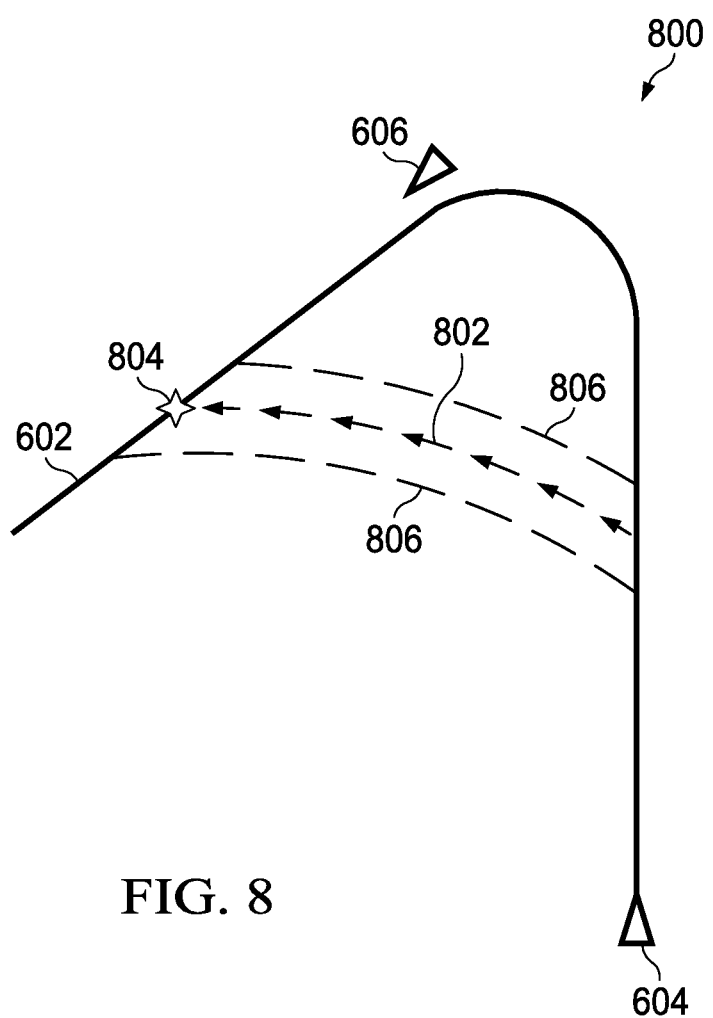
FIG. 8 is an illustration of an example of a turn guidance display for turning an aircraft inside of a turn in a planned route for the aircraft in accordance with an illustrative embodiment.

Turning to FIG. 8, an illustration of an example of a turn guidance display for turning an aircraft inside of a turn in a planned route for the aircraft is depicted in accordance with an illustrative embodiment. Turn guidance display 800 may result from a determination by air traffic control that the situation indicated in turn guidance display 600 in FIG. 6 indicates that the current spacing between the aircraft 604 and a lead aircraft 606 is too large to achieve the desired spacing. In this case, air traffic control may instruct the aircraft to turn left from the planned route for the aircraft and then to return to the planned route for the aircraft, thereby to shorten the travel path for the aircraft.

Turn guidance display 800 includes turn path indicator 802 indicating the turn path for the aircraft to follow back to the planned route for the aircraft. Intercept point indicator 804 indicates the intercept point where the turn path for the aircraft intercepts the planned route for the aircraft. Turn path deviation limit indicators 806 may be included in turn guidance display 800 to indicate turn path deviation limits relative to the turn path. For example, without limitation, the turn path deviation limits may be substantially parallel with the turn path, preferably to both sides of the turn path.

Figure 9:
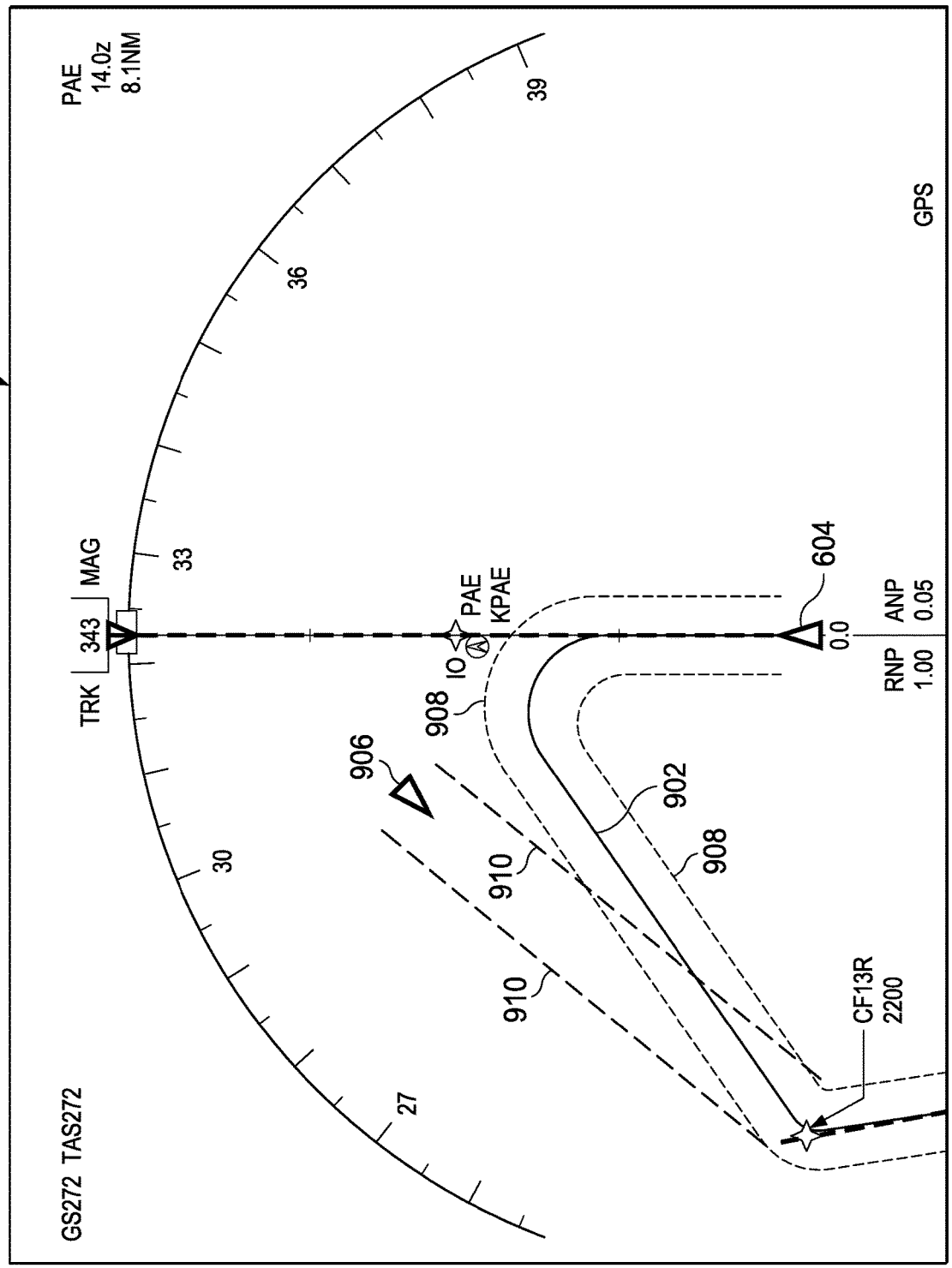
FIG. 9 is an illustration of an example of a display of deviation limits in accordance with an illustrative embodiment.

Turning to FIG. 9, an illustration of an example of a display of deviation limits is depicted in accordance with an illustrative embodiment. Display 900 may be another example of one implementation of turn guidance display 223 in FIG. 2, turn guidance display 301 in FIG. 3, and turn guidance display 400 in FIG. 4.

Display 900 comprises planned route indicator 902 indicating a planned route for an aircraft. Aircraft position indicator 604 indicates the current position of the aircraft with respect to the planned route for the aircraft. Other aircraft indicator 906 indicates the position of another aircraft that will be merging with the planned route for the aircraft at a merger point. A desired spacing between the aircraft and the other aircraft is to be achieved at the merge point or at another point further down the planned route.

Display 900 also includes indications to show an operator of an aircraft if either the aircraft is deviating from the planned route for the aircraft or the other aircraft is deviating from the planned route for the other aircraft by more than a defined limit. Planned route deviation limits indicator 908 indicates deviation limits from the planned route for the aircraft. Planned route deviation limits indicator 910 indicates deviation limits from the planned route for the lead aircraft. The color or other indicator characteristics of these indications may be changed in response to a determination that an aircraft has deviated beyond the corresponding planned route deviation limits or if deviation from the planned route by either aircraft would render the spacing task infeasible. Alternatively, or in addition, the color or other indicator characteristics of these indications may be changed in response to a determination that the position and track of the aircraft indicates that deviation beyond the planned route deviation limits is imminent.

Figure 10:
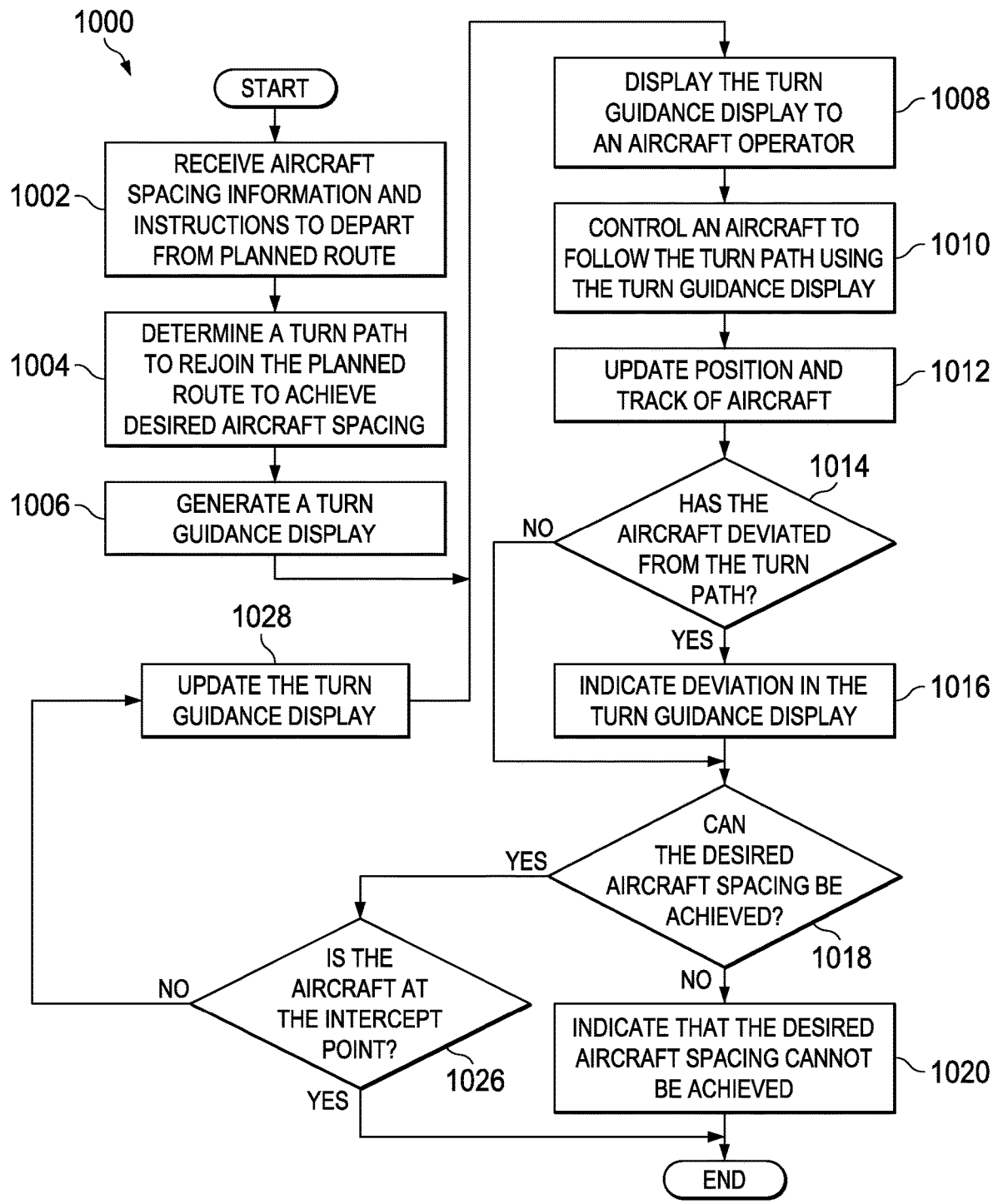
FIG. 10 is an illustration of a flowchart of a process for turning an aircraft in accordance with an illustrative embodiment.

Turning to FIG. 10, an illustration of a flowchart of a process for turning an aircraft is depicted in accordance with an illustrative embodiment. Process 1000 may be implemented, for example, using turn guidance generator 222 in FIG. 2.

Process 1000 begins with receiving aircraft spacing information and instructions for the aircraft to depart from a planned route for the aircraft (operation 1002). For example, the aircraft spacing information and instructions to depart from the planned route may be received from an air traffic control system with the intention of controlling the movement of the aircraft to achieve a desired spacing between the aircraft and another aircraft. A turn path for the aircraft to rejoin the planned route for the aircraft to achieve the desired spacing is determined (operation 1004). A turn guidance display is generated (operation 1006). The turn guidance display may include a turn path indicator and other appropriate indicators to help the operator of the aircraft to follow the turn path, as described herein. The turn guidance display is displayed to an aircraft operator (operation 1008). The aircraft is then controlled to follow the turn path using the turn guidance provided on the turn guidance display (operation 1010).

The current aircraft position and track then may be updated (operation 1012). It then may be determined, using the current aircraft position and track, whether the aircraft has deviated from the turn path (operation 1014). In response to a determination that the aircraft has deviated from the turn path, the deviation is indicated in the turn guidance display (operation 1016). For example, deviation of the aircraft from the turn path may be indicated by changing a number of indicator characteristics of a turn path indicator or of a turn path deviation limit indicator in the turn guidance display.

It then may be determined whether the desired aircraft spacing can be achieved by a point identified in the received aircraft spacing information (operation 1018). In response to a determination that the desired spacing cannot be achieved by the specified point, it may be indicated that the desired spacing cannot be achieved (operation 1020), with the process terminating thereafter. For example, without limitation, a number of indicator characteristics of a merge point indicator or other indicator in the turn guidance display may be changed to indicate that the desired spacing may not be achieved.

In response to a determination at operation 1018 that the desired aircraft spacing can be achieved, it may be determined whether the aircraft is at the intercept point where the aircraft rejoins the planned route for the aircraft (operation 1026). If the aircraft is not yet at the intercept point, the turn guidance display may be updated (operation 1028) based on the updated position of the aircraft and the process then continues with operation 1008. Process 1000 terminates in response to a determination at operation 1026 that the aircraft is at the intercept point. Alternatively, process 1000 may be terminated in response to a determination that the aircraft has completed the turn in the turn path and that the aircraft is flying direct to the intercept point.

Figure 11A:
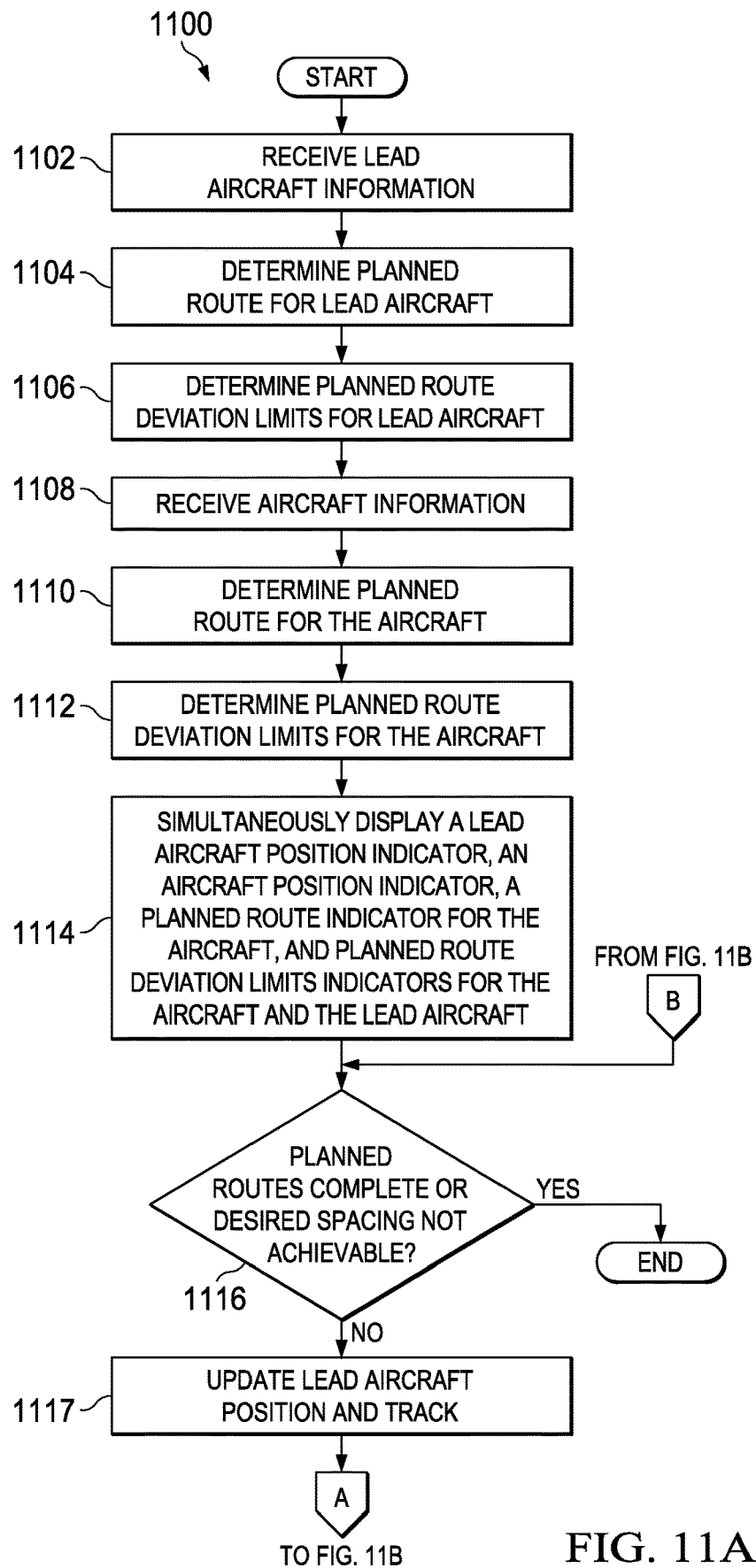
FIGS. 11A and 11B are illustrations of a flowchart of a process for displaying deviation limits for planned routes in accordance with an illustrative embodiment.
Figure 11B:
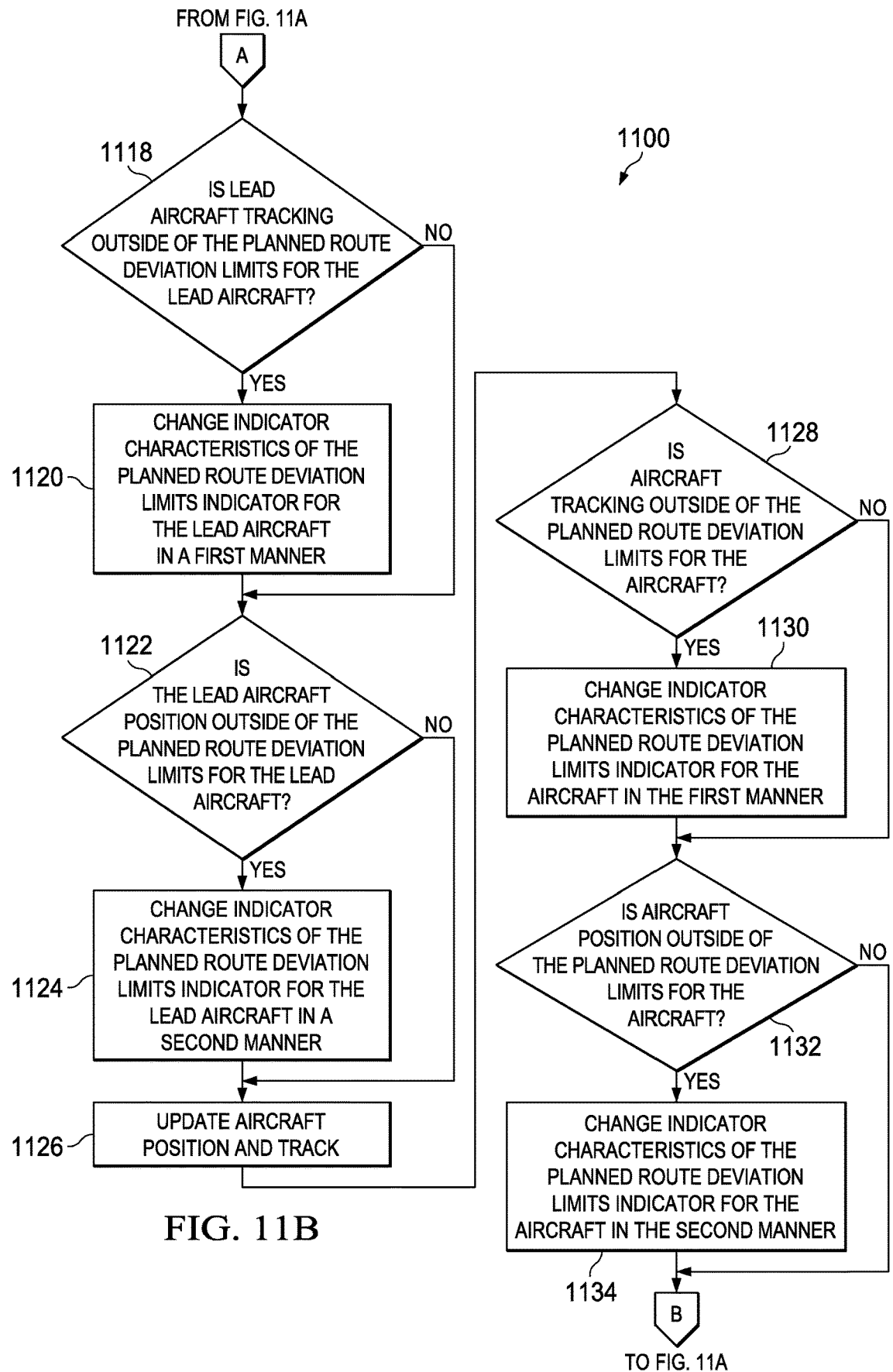

Turning to FIGS. 11A and 11B, an illustration of a flowchart of a process for displaying deviation limits for planned routes is depicted in accordance with an illustrative embodiment. For example, process 1100 may be implemented in turn guidance generator 222 to display deviation limits as part of turn guidance display 223 in FIG. 2. Process 1100 may be implemented in turn guidance display generator 300 to display deviation limits as part of turn guidance display 301 in FIG. 3. Process 1100 may be used to display deviation limits as part of turn guidance display 400 in FIG. 4.

Process 1100 may begin with receiving lead aircraft information (operation 1102). A planned route for the lead aircraft is determined (operation 1104). Planned route deviation limits for the lead aircraft also are determined (operation 1106). For example, without limitation, the planned route deviation limits for the lead aircraft may be substantially parallel to the planned route for the lead aircraft.

Aircraft information also is received (operation 1108). A planned route for the aircraft is determined (operation 1110). Planned route deviation limits for the aircraft also are determined (operation 1112). For example, without limitation, the planned route deviation limits for the aircraft may be substantially parallel to the planned route for the aircraft.

A lead aircraft position indicator, an aircraft position indicator, a planned route indicator for the aircraft, and planned route deviation limits indicators for the aircraft and for the lead aircraft are displayed simultaneously (operation 1114). It then may be determined whether the planned routes for the aircraft or the lead aircraft are complete or a desired spacing between the aircraft and the lead aircraft is no longer possible (operation 1116). Process 1100 may terminate in response to a determination that either the planned routes are complete or the desires spacing between the aircraft and the lead aircraft may not be achieved.

If the process does not terminate following operation 1116, the lead aircraft position and track may be updated (operation 1117). It then may be determined whether the lead aircraft is tracking outside of the planned route deviation limits for the lead aircraft (operation 1118). For example, without limitation, the lead aircraft may be determined to be likely to exceed the planned route deviation limits when the track of the aircraft is directed outside of the planned route deviation limits for more than a threshold period of time. When the lead aircraft is tracking outside of the planned route deviation limits within a threshold value of time, indicator characteristics of the planned route deviation limits may be changed in a first manner (operation 1120). Operation 1120 may not be performed in response to a determination at operation 1118 that the lead aircraft is not tracking outside of the planned route deviation limits for the lead aircraft.

It then may be determined whether the lead aircraft position is outside of the planned route deviation limits for the lead aircraft (operation 1122). When the lead aircraft position is outside of the planned route deviation limits, indicator characteristics of the planned route deviation limits for the lead aircraft may be changed in a second manner (operation 1124). Operation 1124 may not be performed in response to a determination at operation 1122 that the position of the lead aircraft is not outside of the planned route deviation limits for the lead aircraft.

The aircraft position and track then may be updated to the current position and track (operation 1126). It then may be determined whether the aircraft is tracking outside of the planned route deviation limits for the aircraft for more than a threshold value of time (operation 1128). When the aircraft is tracking outside of the planned route deviation limits for more than the threshold value of time, indicator characteristics of the planned route deviation limits indicator for the aircraft may be changed in first manner (operation 1130). Operation 1130 is not performed in response to a determination at operation 1128 that the aircraft is not tracking outside of the planned route deviation limits for the aircraft.

It then may be determined whether the position of the aircraft is outside of the planned route deviation limits for the aircraft (operation 1132). When the aircraft position is outside of the planned route deviation limits, indicator characteristics of the planned route deviation limits indicator for the aircraft may be changed in a second manner (operation 1134), with the process then returning to operation 1116. Process 1100 returns to operation 1116 without performing operation 1134 in response to a determination at operation 1132 that the aircraft position is not outside of the planned route deviation limits.

Figure 12:
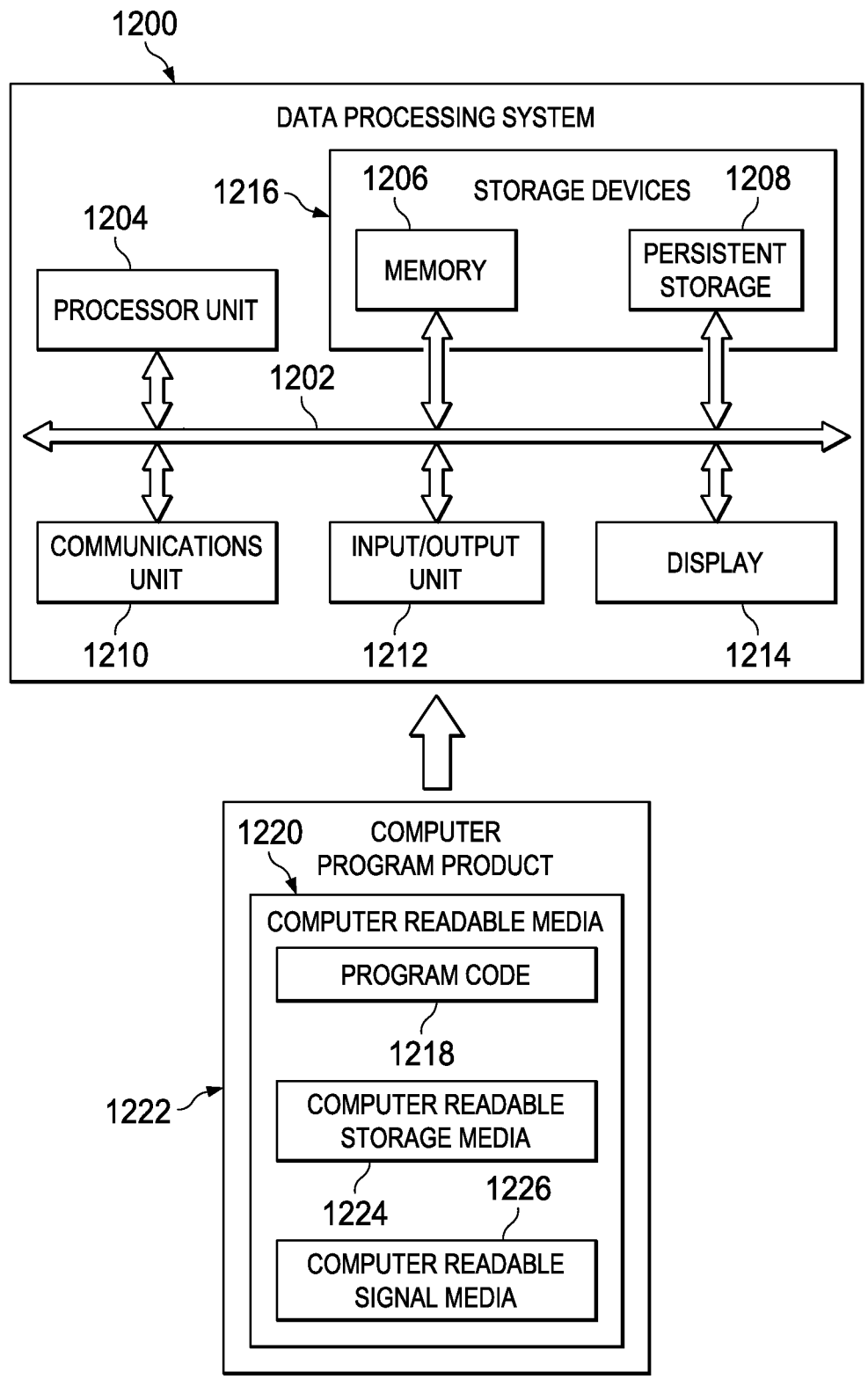
FIG. 12 is an illustration of a block diagram of a data processing system in accordance with an illustrative embodiment.

Turning to FIG. 12, an illustration of a block diagram of a data processing system is depicted in accordance with an illustrative embodiment. Data processing system 1200 may be an example of one implementation of aircraft data processing system 240 in FIG. 2. Data processing system 1200 may be an example of one implementation of a data processing system on which turn guidance generator 222 in FIG. 2 or turn guidance generator 300 in FIG. 3 may be implemented.

In this illustrative example, data processing system 1200 includes communications fabric 1202. Communications fabric 1202 provides communications among processor unit 1204, memory 1206, persistent storage 1208, communications unit 1210, input/output (I/O) unit 1212, and display 1214.

Processor unit 1204 serves to execute instructions for software that may be loaded into memory 1206. Processor unit 1204 may be a number of processors, a multi-processor core, or some other type of processor, depending on the particular implementation. A number, as used herein with reference to an item, means one or more items. Further, processor unit 1204 may be implemented using a number of heterogeneous processor systems in which a main processor is present with secondary processors on a single chip. As another illustrative example, processor unit 1204 may be a symmetric multi-processor system containing multiple processors of the same type.

Memory 1206 and persistent storage 1208 are examples of storage devices 1216. A storage device is any piece of hardware that is capable of storing information, such as, for example, without limitation, data, program code in functional form, and/or other suitable information either on a temporary basis and/or a permanent basis. Storage devices 1216 may also be referred to as computer readable storage devices in these examples. Memory 1206, in these examples, may be, for example, a random access memory or any other suitable volatile or non-volatile storage device. Persistent storage 1208 may take various forms, depending on the particular implementation.

For example, persistent storage 1208 may contain one or more components or devices. For example, persistent storage 1208 may be a hard drive, a flash memory, a rewritable optical disk, a rewritable magnetic tape, or some combination of the above. The media used by persistent storage 1208 also may be removable. For example, a removable hard drive may be used for persistent storage 1208.

Communications unit 1210, in these examples, provides for communications with other data processing systems or devices. In these examples, communications unit 1210 is a network interface card. Communications unit 1210 may provide communications through the use of either or both physical and wireless communications links.

Input/output unit 1212 allows for input and output of data with other devices that may be connected to data processing system 1200. For example, input/output unit 1212 may provide a connection for user input through a keyboard, a mouse, and/or some other suitable input device. Further, input/output unit 1212 may send output to a printer. Display 1214 provides a mechanism to display information to a user.

Instructions for the operating system, applications, and/or programs may be located in storage devices 1216, which are in communication with processor unit 1204 through communications fabric 1202. In these illustrative examples, the instructions are in a functional form on persistent storage 1208. These instructions may be loaded into memory 1206 for execution by processor unit 1204. The processes of the different embodiments may be performed by processor unit 1204 using computer-implemented instructions, which may be located in a memory, such as memory 1206.

These instructions are referred to as program instructions, program code, computer usable program code, or computer readable program code that may be read and executed by a processor in processor unit 1204. The program code in the different embodiments may be embodied on different physical or computer readable storage media, such as memory 1206 or persistent storage 1208.

Program code 1218 is located in a functional form on computer readable media 1220 that is selectively removable and may be loaded onto or transferred to data processing system 1200 for execution by processor unit 1204. Program code 1218 and computer readable media 1220 form computer program product 1222 in these examples. In one example, computer readable media 1220 may be computer readable storage media 1224 or computer readable signal media 1226.

Computer readable storage media 1224 may include, for example, an optical or magnetic disk that is inserted or placed into a drive or other device that is part of persistent storage 1208 for transfer onto a storage device, such as a hard drive, that is part of persistent storage 1208. Computer readable storage media 1224 also may take the form of a persistent storage, such as a hard drive, a thumb drive, or a flash memory, that is connected to data processing system 1200. In some instances, computer readable storage media 1224 may not be removable from data processing system 1200.

In these examples, computer readable storage media 1224 is a physical or tangible storage device used to store program code 1218 rather than a medium that propagates or transmits program code 1218. Computer readable storage media 1224 is also referred to as a computer readable tangible storage device or a computer readable physical storage device. In other words, computer readable storage media 1224 is a media that can be touched by a person.

Alternatively, program code 1218 may be transferred to data processing system 1200 using computer readable signal media 1226. Computer readable signal media 1226 may be, for example, a propagated data signal containing program code 1218. For example, computer readable signal media 1226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1218 may be downloaded over a network to persistent storage 1208 from another device or data processing system through computer readable signal media 1226 for use within data processing system 1200. For instance, program code stored in a computer readable storage medium in a server data processing system may be downloaded over a network from the server to data processing system 1200. The data processing system providing program code 1218 may be a server computer, a client computer, or some other device capable of storing and transmitting program code 1218.

The different components illustrated for data processing system 1200 are not meant to provide architectural limitations to the manner in which different embodiments may be implemented. The different illustrative embodiments may be implemented in a data processing system including components in addition to or in place of those illustrated for data processing system 1200. Other components shown in FIG. 12 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1204 may take the form of a hardware unit that has circuits that are manufactured or configured for a particular use. This type of hardware may perform operations without needing program code to be loaded into a memory from a storage device to be configured to perform the operations.

For example, when processor unit 1204 takes the form of a hardware unit, processor unit 1204 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 1218 may be omitted, because the processes for the different embodiments are implemented in a hardware unit.

In still another illustrative example, processor unit 1204 may be implemented using a combination of processors found in computers and hardware units. Processor unit 1204 may have a number of hardware units and a number of processors that are configured to run program code 1218. With this depicted example, some of the processes may be implemented in the number of hardware units, while other processes may be implemented in the number of processors.

In another example, a bus system may be used to implement communications fabric 1202 and may be comprised of one or more buses, such as a system bus or an input/output bus. Of course, the bus system may be implemented using any suitable type of architecture that provides for a transfer of data between different components or devices attached to the bus system.

Additionally, communications unit 1210 may include a number of devices that transmit data, receive data, or transmit and receive data. Communications unit 1210 may be, for example, a modem or a network adapter, two network adapters, or some combination thereof. Further, a memory may be, for example, memory 1206, or a cache, such as found in an interface and memory controller hub that may be present in communications fabric 1202.

The flowcharts and block diagrams in the different depicted embodiments illustrate the architecture, functionality, and operation of some possible implementations of apparatuses and methods in illustrative embodiments. In this regard, each block in the flowcharts or block diagrams may represent a module, segment, function, and/or a portion of an operation or step. For example, one or more of the blocks may be implemented as program code, in hardware, or a combination of program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order shown in the figures. For example, in some cases, two blocks shown in succession may be executed substantially concurrently, or the blocks may sometimes be performed in the reverse order, depending upon the functionality involved. Also, other blocks may be added in addition to the blocks illustrated in a flowchart or block diagram.

The description of the different illustrative embodiments has been presented for purposes of illustration and description and is not intended to be exhaustive or to limit the embodiments in the form disclosed. Many modifications and variations will be apparent to those of ordinary skill in the art. Further, different illustrative embodiments may provide different benefits as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of controlling a movement of an aircraft to an air traffic control instructed spacing in trail of an other aircraft, the method comprising:
    receiving, in a turn guidance generator, the air traffic control instructed spacing in trail of the other aircraft;
    determining, using the turn guidance generator the air traffic control instructed spacing in trail of the other aircraft, a turn path off of a planned route for the aircraft, the turn path comprising:
        a turn guiding the aircraft off of the planned route for the aircraft to an intercept point rejoining the aircraft to the planned route for the aircraft and placing the aircraft at the air traffic control instructed spacing in trail of the other aircraft; and
        deviation limits substantially parallel to and bordering both sides of the turn path;
    simultaneously displaying on a turn guidance display:
        a planned route indicator depicting the planned route for the aircraft;
        a turn path indicator depicting the turn path relative to the planned route for the aircraft, such that the planned route indicator and the turn path indicator each comprise a unique indicator characteristic, respectively; and
        an aircraft position indicator indicating a position of the aircraft relative to: the planned route for the aircraft, the deviation limits relative to the turn path, and the turn path; and
    using the turn guidance display for controlling the movement of the aircraft to follow the turn path and placing the aircraft at the air traffic control instructed spacing in trail of the other aircraft.

2. The method of claim 1, wherein determining the turn path comprises:
    determining a start turn point, for beginning the turn, on the turn path; and
    changing, responsive to the position of the aircraft being approximately at the start turn point, a number of indicator characteristics of the turn path indicator.

3. The method of claim 1, wherein determining the turn path comprises:
    determining the turn path to achieve the air traffic control instructed spacing in trail of the other aircraft; and
    displaying, on the turn guidance display, an other aircraft position indicator indicating a position of the other aircraft relative to: the planned route for the aircraft, the turn path, and the position of the aircraft.

4. The method of claim 3 further comprising:
    displaying, on the turn guidance display, a merge point indicator indicating a merge point between the planned route for the aircraft and a planned route for the other aircraft; and
    changing, responsive to determining that the air traffic control instructed spacing in trail of the other aircraft may not be achieved, a number of indicator characteristics of the merge point indicator.

5. The method of claim 3 further comprising:
    identifying an other aircraft planned route for the other aircraft;
    determining, substantially parallel to and bordering both sides of the other aircraft planned route, other aircraft planned route deviation limits for the other aircraft;
    displaying, on the turn guidance display, an other aircraft planned route deviation limits indicator depicting the other aircraft planned route deviation limits; and
    changing a number of indicator characteristics of the other aircraft planned route deviation limits indicator in response to the turn guidance generator determining at least one of:
        a track of the other aircraft indicating the other aircraft tracking outside of the other aircraft planned route deviation limits; and
        the position of the other aircraft being outside of the other aircraft planned route deviation limits.

6. The method of claim 1, further comprising:
    the turn guidance generator being in the aircraft; and
    the turn guidance display comprising a navigation display on a flight deck of the aircraft.

7. An apparatus, comprising:
    a turn calculator, comprising a processor in an aircraft, configured to determine, based upon an air traffic control instructed spacing in trail of an other aircraft, a turn path, that comprises a turn that directs the aircraft off of a planned route to an intercept point that rejoins the turn path to the planned route at the air traffic control instructed spacing in trail of the other aircraft; and
    a display generator configured to simultaneously display, on a turn guidance display, a planned route indicator that comprises:
        the planned route for the aircraft;
        a turn path indicator that comprises the turn path relative to the planned route for the aircraft, wherein the planned route indicator and the turn path indicator each comprise a unique indicator characteristic, respectively; and
an aircraft position indicator that comprises a position of the aircraft relative to:
the planned route for the aircraft;
a deviation limit substantially parallel to and bordering both sides of the planned route; and
the turn path.

8. The apparatus of claim 7, further comprising:
the aircraft comprising the turn calculator configured to determine a start turn point on the turn path; and
the display generator configured to change, responsive to the position of the aircraft being approximately at the start turn point, a number of indicator characteristics of the turn path indicator.

9. The apparatus of claim 7 further comprising:
a deviation identifier configured to identify turn path deviation limits, the turn path deviation limits being substantially parallel to and bordering both sides of the turn path; and
the display generator configured to display, on the turn guidance display, a turn path deviation limits indicator that depicts the turn path deviation limits relative to the turn path.

10. The apparatus of claim 7, further comprising:
the turn calculator configured to:
determine the turn path; and
achieve the air traffic control instructed spacing in trail of the other aircraft; and
the display generator configured to display, on the turn guidance display, an other aircraft position indicator that comprises an indication of a position of the other aircraft relative to:
the planned route for the aircraft;
the turn path; and
the position of the aircraft.

11. The apparatus of claim 10, wherein the display generator is configured to:
display, on the turn guidance display, a merge point indicator that indicates a merge point between the planned route for the aircraft and a planned route for the other aircraft; and
change a number of indicator characteristics of the merge point indicator, in response to a determination that the air traffic control instructed spacing in trail of the other aircraft may not be achieved.

12. The apparatus of claim 10 further comprising:
an information receiver configured to receive information that comprises a planned route for the other aircraft;
a deviation identifier configured to determine other aircraft planned route deviation limits, the other aircraft planned route deviation limits being substantially parallel to and bordering both sides of the planned route for the other aircraft; and
the display generator configured to:
display, on the turn guidance display, an other aircraft planned route deviation limits indicator that comprises an indication of the other aircraft planned route deviation limits; and
change a number of indicator characteristics of the other aircraft planned route deviation limits indicator in response to at least one of:
a determination that a position and track of the other aircraft indicates that the other aircraft is tracking outside of the other aircraft planned route deviation limits.

13. The apparatus of claim 7, wherein the turn guidance display comprises a navigation display on a flight deck of the aircraft.

14. A method of controlling a movement of an aircraft, the method comprising a turn guidance generator:
identifying a planned route for the aircraft;
determining planned route deviation limits, the planned route deviation limits being substantially parallel to and bordering both sides of the planned route for the aircraft;
displaying simultaneously, on a turn guidance display:
a planned route deviation limits indicator depicting the planned route deviation limits; and
an aircraft position indicator indicating a position of the aircraft relative to the planned route deviation limits; and
using the turn guidance display using an air traffic control instructed spacing from an other aircraft for guiding the aircraft along a turn path off of the planned route and returning the aircraft to a point along the planned route at the air traffic control instructed spacing in trail of the other aircraft.

15. The method of claim 14 further comprising:
changing a number of indicator characteristics of the planned route deviation limits indicator in response to the turn guidance generator determining a position and track of the aircraft indicating the aircraft tracking outside of the planned route deviation limits.

16. The method of claim 14 further comprising:
identifying a planned route for the other aircraft;
determining other aircraft planned route deviation limits, the other aircraft planned route deviation limits being substantially parallel to and bordering both sides of the planned route for the other aircraft; and
displaying simultaneously, on the turn guidance display:
an other aircraft planned route deviation limits indicator depicting the other aircraft planned route deviation limits; and
an other aircraft position indicator indicating a position of the other aircraft relative to the other aircraft planned route deviation limits.

17. An apparatus, comprising:
a turn guidance generator configured to receive: an air traffic control instructed spacing in trail of an other aircraft;
an information receiver configured to receive information that comprises a planned route for an aircraft;
a deviation identifier configured to determine planned route deviation limits, the planned route deviation limits being substantially parallel to and bordering both sides of the planned route for the aircraft; and
a display generator configured to simultaneously display, on a turn guidance display:
a turn path that guides the aircraft off the planned route and back to an intercept point configured to place the aircraft back on the planned route at the air traffic control instructed spacing in trail of the other aircraft; and
a planned route deviation limits indicator that comprises:
an indication of the planned route deviation limits for the aircraft; and
an aircraft position indicator that comprises an indication of a position of the aircraft relative to the planned route deviation limits.

18. The apparatus of claim 17, wherein the display generator is configured to:

change a number of indicator characteristics of the planned route deviation limits indicator in response to a determination that a position and track of the aircraft indicates the aircraft being outside of the planned route deviation limits from the planned route for the aircraft.

19. The apparatus of claim 17, further comprising:

the information receiver configured to receive information that comprises a planned route for the other aircraft;

the deviation identifier configured to identify other aircraft planned route deviation limits, the other aircraft planned route deviation limits being substantially parallel to and bordering both sides of the planned route for the other aircraft; and the display generator configured to display, on the turn guidance display:

an other aircraft planned route deviation limits indicator that comprises the other aircraft planned route deviation limits; and an other aircraft position indicator that comprises a position of the other aircraft relative to the other aircraft planned route deviation limits.

20. The apparatus of claim 17, further comprising the display generator configured to simultaneously display, on the turn guidance display indicators for the following: the planned route, an other aircraft position, a start turn point, the intercept point, and a merge point.

* * * * *